(12) United States Patent
Koo

(10) Patent No.: US 12,402,688 B2
(45) Date of Patent: *Sep. 2, 2025

(54) PRODUCT HAVING A TAB WITH AN EMBEDDED MEMORY PORTION

(71) Applicant: Dynasty Footwear, Ltd., El Segundo, CA (US)

(72) Inventor: John C. S. Koo, Los Angeles, CA (US)

(73) Assignee: Dynasty Footwear, Ltd., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,040

(22) Filed: Oct. 23, 2023

(65) Prior Publication Data

US 2024/0049834 A1 Feb. 15, 2024

Related U.S. Application Data

(63) Continuation of application No. 17/233,505, filed on Apr. 18, 2021, now Pat. No. 11,805,853, which is a continuation of application No. 16/351,796, filed on Mar. 13, 2019, now Pat. No. 11,006,694, which is a continuation of application No. 13/857,190, filed on Apr. 5, 2013, now Pat. No. 10,276,068, which is a
(Continued)

(51) Int. Cl.
| | | |
|---|---|---|
| A43B 9/00 | (2006.01) |
| A43B 3/00 | (2022.01) |
| A43B 23/24 | (2006.01) |
| A43D 95/14 | (2006.01) |
| G06K 19/077 | (2006.01) |
| G09F 3/02 | (2006.01) |
| A43B 13/14 | (2006.01) |

(52) U.S. Cl.
CPC .............. *A43B 9/00* (2013.01); *A43B 3/0078* (2013.01); *A43B 23/24* (2013.01); *A43D 95/14* (2013.01); *G06K 19/07798* (2013.01); *G09F 3/02* (2013.01); *A43B 13/14* (2013.01)

(58) Field of Classification Search
None
See application file for complete search history.

(56) References Cited

U.S. PATENT DOCUMENTS 2,254,351 A 9/1941 Cambell
2,739,399 A * 3/1956 Henson ..................... G09F 3/04
2/400

(Continued)

OTHER PUBLICATIONS

Prosecution history of, including prior art cited in, parent U.S. Appl. No. 12/422,154, filed Apr. 10, 2009 (now U.S. Pat. No. 9,107,480).
(Continued)

*Primary Examiner* — Jila M Mohandesi
(74) *Attorney, Agent, or Firm* — Joseph G. Swan; LOZA & LOZA, LLP

(57) ABSTRACT

Provided is, among other things, a shoe having a sole that includes multiple layers and an upper attached to and extending above the sole. In addition, the shoe includes a tab having: (1) a first portion, located between adjacent layers of the sole and thus hidden from view, that is imprinted with identification information pertaining to the shoe and (2) a second portion that is visible during ordinary use of the shoe.

20 Claims, 4 Drawing Sheets

Related U.S. Application Data continuation of application No. 12/422,154, filed on Apr. 10, 2009, now Pat. No. 9,107,480.

(60) Provisional application No. 61/108,488, filed on Oct. 25, 2008.

(56) References Cited

U.S. PATENT DOCUMENTS

| | | | |
|---|---|---|---|
| 3,755,934 A | 9/1973 | Porcher et al. | |
| 4,254,566 A * | 3/1981 | Haskell | G09F 3/04 40/636 |
| 4,624,060 A * | 11/1986 | Maxwell | A43D 999/00 24/713 |
| 4,761,835 A * | 8/1988 | Chen | G04B 47/068 2/160 |
| 4,845,863 A * | 7/1989 | Yung-Mao | A43B 13/184 36/114 |
| 4,858,957 A | 8/1989 | Capozzola | |
| 4,897,936 A * | 2/1990 | Fuerst | A43B 13/223 36/31 |
| 5,477,633 A * | 12/1995 | Leinberger | G09F 3/005 40/586 |
| 5,508,684 A * | 4/1996 | Becker | G08B 13/2437 342/44 |
| 5,704,067 A * | 1/1998 | Brady | G09F 3/005 273/DIG. 26 |
| 5,775,005 A * | 7/1998 | McClelland | A43B 13/184 36/31 |
| 5,913,618 A * | 6/1999 | Yosha | G09F 3/20 24/3.12 |
| 6,091,333 A | 7/2000 | Oshima | |
| 6,563,424 B1 * | 5/2003 | Kaario | G06F 1/163 340/572.1 |
| 6,728,971 B1 * | 5/2004 | Benavidez | A63B 71/146 2/161.4 |
| 7,168,098 B2 * | 1/2007 | West | A41D 27/20 2/93 |
| 7,543,402 B2 | 6/2009 | Halliday | |
| 7,898,439 B2 | 3/2011 | Bettez et al. | |
| 8,665,093 B2 | 3/2014 | Peeters et al. | |
| 8,677,515 B2 * | 3/2014 | Ishihara | A41D 1/002 2/125 |
| 9,351,534 B2 * | 5/2016 | Peikert | A43B 13/12 |
| 9,521,875 B2 * | 12/2016 | Grove | A43B 7/14 |
| 9,961,959 B2 * | 5/2018 | Gerber | A43B 13/026 |
| 2005/0246823 A1 * | 11/2005 | Groom | A41D 27/205 2/247 |
| 2007/0222601 A1 | 9/2007 | Keyaki et al. | |
| 2009/0126230 A1 * | 5/2009 | McDonald | A43B 13/12 36/103 |
| 2011/0192056 A1 * | 8/2011 | Geser | A43B 13/26 36/114 |
| 2016/0278484 A1 * | 9/2016 | Aslani | A43B 5/02 |
| 2018/0317591 A1 * | 11/2018 | Hollinger | A43B 13/223 |
| 2022/0124102 A1 | 4/2022 | Zhang et al. | |

OTHER PUBLICATIONS

Prosecution history of, including prior art cited in, parent U.S. Appl. No. 13/857,190, filed Apr. 5, 2013 (now U.S. Pat. No. 10,276,068).
Prosecution history of, including prior art cited in, parent U.S. Appl. No. 16/351,796, filed Mar. 13, 2019. (now U.S. Pat. No. 11,006,694).
Prosecution history of, including prior art cited in, parent U.S. Appl. No. 17/233,505, filed Apr. 18, 2021 (now U.S. Pat. No. 11,805,853).
International Search Report and Written Opinion for Application No. PCT/US25/14733, dated Apr. 22, 2025, 12 pages.

* cited by examiner

PRODUCT HAVING A TAB WITH AN EMBEDDED MEMORY PORTION

This application claims the benefit of U.S. Provisional Patent Application Ser. No. 61/108,488, filed on Oct. 25, 2008, and titled "Securely Printed Shoe Tab", which application is incorporated by reference herein as though set forth herein in full.

FIELD OF THE INVENTION

The present invention pertains, among other things, to footwear (i.e., shoes) that include a securely printed tab, e.g., so as to prevent at least some of the printed information from becoming obscured, either through wear or through intentional destruction, as well as to the tab itself and methods for manufacturing shoes that include such a tab.

BACKGROUND

It sometimes is the case that a manufacturer of shoes wants or is required to include certain information on its products. For example, Section 103 of the Consumer Products Safety Act of 2008, HR 4040, enacted as Public Law No. 110-314, mandates certain labeling of children's products. However, each of the conventional approaches to product labeling has its own drawbacks and shortcomings.

SUMMARY OF THE INVENTION

The present invention addresses this problem by providing, among other things, a shoe that includes a tab having two portions—a printed portion that is embedded in part of the shoe and an exposed portion.

Thus, one embodiment of the invention is directed to a sole that includes multiple layers and an upper attached to and extending above the sole. In addition, the shoe includes a tab having: (1) a first portion, located between adjacent layers of the sole and thus hidden from view, that is imprinted with identification information pertaining to the shoe and (2) a second portion that is visible during ordinary use of the shoe.

By virtue of the foregoing arrangement, e.g., a shoe can be labeled with information that is protected from wear in ordinary use. Preferably, however, the printed hidden portion of the tab can be retrieved when desired.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

The following disclosure provides certain examples of a shoe that includes a securely printed tab. However, it should be understood that the present invention can apply to any type of shoe, including a shoe having a fully enclosed upper, a shoe having an upper with some openings, or a shoe that has a predominantly open upper (such as a sandal). Accordingly, except to the extent expressly stated to the contrary, the term "shoe" as used herein is intended to encompass any kind of footwear.

Figure 1:
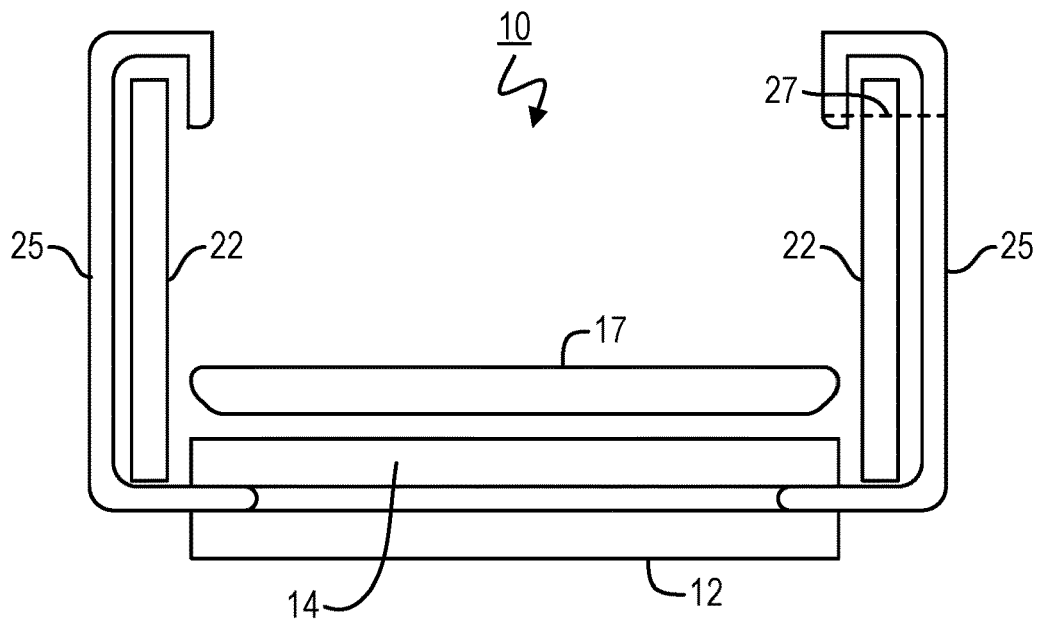
FIG. 1 is an exploded lateral cross-sectional conceptual view of a representative conventional shoe.

FIG. 1 is an exploded cross-sectional conceptual view of a representative conventional shoe 10 that includes at least some layered construction. For example, the sole of shoe 10 includes an outsole 12 and an insole 14. A sock layer 17 is disposed on top of the insole 14, with the result that three layers are provided beneath the wearer's foot (i.e., outsole 12, insole 14 and sock layer 17). At the same time, the shoe's upper includes an inner wall 22 and an outer wall 25, so that the shoe's sidewalls include two different layers.

The various layers can be joined together in any of a variety of different ways, including stitching, gluing, any other kind of bonding, or any combination of any of the foregoing. For instance, outsole 12 and insole 14 can be both glued and stitched together. In addition, as shown in FIG. 1, outer wall 25 might be sandwiched between outsole 12 and insole 14 at its lower end, while inner wall 22 is glued and/or stitched to insole 14 at its lower end, with inner wall 22 and outer wall 25 being stitched together at their upper ends (e.g., using stitching 27) after folding the top edge 85 of outer wall 25 over the top edge of inner wall 22. In any event, the precise method for attaching the various layers that form a particular shoe typically will not be important to the present invention. In addition, as discussed in more detail below, the present invention typically can be used with a wide variety of different kinds of shoes.

Generally speaking, the present invention contemplates the use of a tab that is imprinted with, or otherwise provided with, information identifying (or otherwise pertaining to) the shoe to which the tab is attached. Preferably, the tab is configured as a rectangular piece of thin sheet material, such as nylon, another synthetic material or a natural fabric material. In any event, at least in embodiments in which the exposed part of the tab is located inside the shoe, the tab preferably is relatively soft, such that no, substantially no, or very little discomfort will result when disposed adjacent the wearer's foot. In certain embodiments, the tab has a length of 1-4 cm (centimeters) and a width of 0.5-2.0 cm, although the precise dimensions typically will be determined by the amount of space that is required to accommodate the desired printed indicia. That amount, in turn, typically will depend upon the amount of information to be included, as well as the printing or other encoding method to be used, particularly the size of the characters or other symbols or codes used.

The information that is provided on the tab preferably includes identification information for the shoe to which the tab is attached. More preferably, such information preferably allows identification of the particular manufacturing lot of which the shoe was a part (e.g., by specifying the name of the manufacturer, the location in which the shoe was manufactured, and/or the specific lot number). Accordingly, such information can include a code specifically identifying the manufacturing lot or other information that allows one to determine the manufacturing lot.

Once incorporated into a shoe according to the present invention, the tab preferably includes both a visible portion and a portion that is hidden from view in ordinary use of the shoe. In the preferred embodiments, both such portions include the same or similar identification information. In any event, both such portions preferably include information that permits determination of the manufacturing lot of which the shoe was a part. For example, the portion exposed to view might include a manufacturing lot designation code, e.g., allowing the consumer to easily identify if the shoe has been recalled. At the same time, the information on the portion of the tab that is hidden from view might include a different code that can be interpreted by the manufacturer to identify the manufacturing lot. Also, in alternate embodiments, only the hidden portion of the tab includes the subject (e.g., manufacturing lot) identification information, while the exposed portion includes other information (e.g., the shoe's size and/or the manufacturer's name, trademark or identification information) or is blank.

The ways in which different portions of information are printed or otherwise encoded onto the tab can be the same or can vary depending upon where the information occurs on the tab (e.g., whether it occurs on the hidden portion or the exposed portion of the tab). Either or both can be printed with ink or dye, impressed or surface encoded in any other way. In addition, or instead, either or both can be magnetically encoded (assuming the tab is made of a magnetic material) or encoded using any semiconductor or other memory technology. At the present time, ordinary ink or dye-based printing is preferred, primarily for its cost advantage. However, as future technologies evolve, that preference might change.

Figure 2:
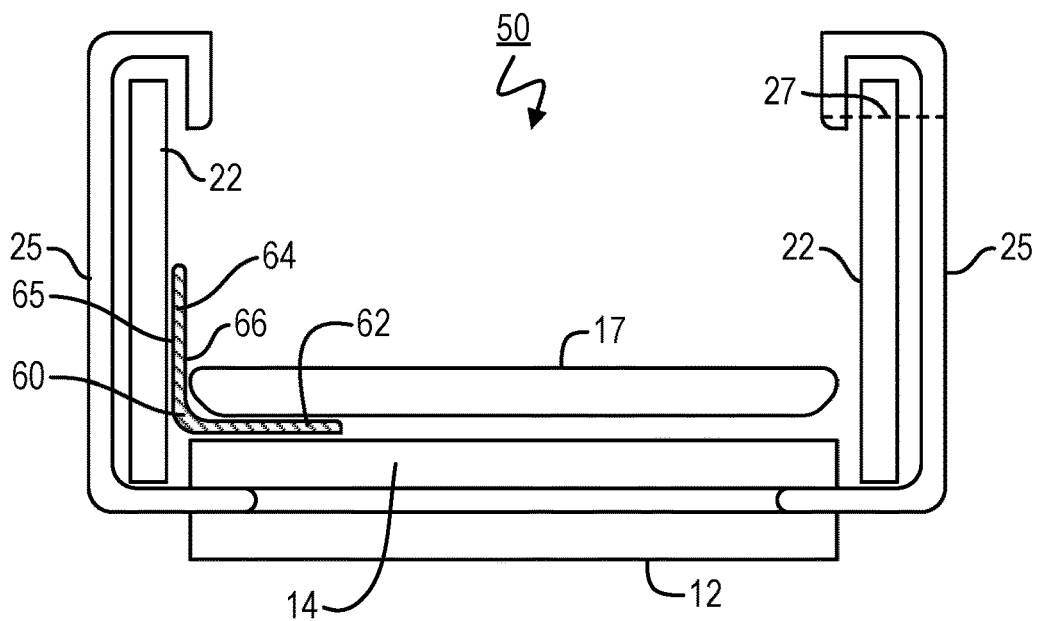
FIG. 2 illustrates an exploded lateral cross-sectional conceptual view of an exemplary shoe having a securely printed tab.

FIG. 2 illustrates an exploded cross-sectional conceptual view of an example of a shoe 50 that includes a tab 60 according to the present invention. As shown, the hidden portion 62 of tab 60 is embedded between the insole 14 and the sock layer 17, such that the visible portion 64 extends upwardly from the sock portion 17. In certain embodiments, the hidden portion 62 of tab 60 is simply inserted between the insole 14 and the sock layer 17 prior to attaching those layers together (e.g., by gluing or stitching). In other embodiments, tab 60 is first attached to one of such layers (e.g., by gluing) and then the two layers are attached to each other (e.g., by gluing or stitching). Also, it is noted that the hidden portion 62 of tab 60 instead could be sandwiched between insole 14 and outsole 12 or between any other layers in the sole of a shoe.

In one specific embodiment, the desired information is imprinted on the outer side 65 of tab 60, so as to reduce the likelihood that it will be rubbed off during normal wear. Then, the user would only need to fold back tab 60 in order to read it. However, such written indicia instead could be imprinted on the inner side 66 of tab 60. In either event, it sometimes is preferable to print the desired information on the same side of tab 60 for both the hidden portion 62 and the visible portion 64, in order to reduce the costs of manufacturing tab 60 (i.e., by using only a single-sided printing).

Figure 3:
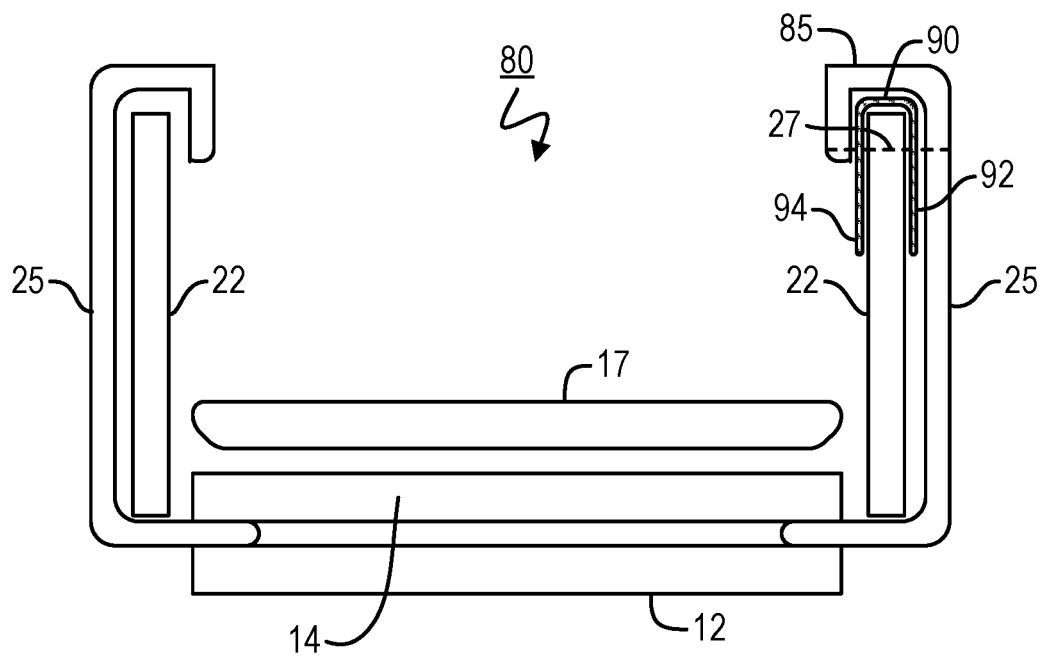
FIG. 3 illustrates an exploded lateral cross-sectional conceptual view of an alternate embodiment of a shoe having a securely printed tab.

FIG. 3 illustrates an exploded cross-sectional conceptual view of an alternate embodiment of a shoe 80 includes a tab 90. In this embodiment, the hidden portion 92 of tab 90 is sandwiched between the inner wall 22 and outer wall 25 of the shoe's upper, so that the visible portion 94 of tab 90 extends downwardly from the top edge 85 of the shoe 80. In the present embodiment, this is accomplished by simply layering portion 92 of tab 90 between inner wall 22 and outer wall 25 and then applying stitching 27. Similar to the preceding embodiment, it often is preferable that the written indicia are imprinted on only a single side of tab 90.

In any event, it is preferable that any side of the tab (e.g., tab 60 or 90) that is imprinted with information within the hidden portion (e.g., hidden portion 62 or 92) is not exposed to glue. For example, referring back to FIG. 2, if the written indicia are printed on the outer side 65 of tab 60 (or at least hidden portion 62 of tab 60), then glue might be applied to the top surface of insole 14, but not to the bottom surface of sock layer 17, when bonding those two layers together.

It should be noted that the foregoing examples merely illustrate certain aspects of the invention. In alternate embodiments, the tab that has been imprinted or otherwise encoded with the desired information can be partially sandwiched between any layers, components or portions of the shoe, or even enclosed within a single layer, component or portion of the shoe. In other words, the hidden imprinted portion of the tab can be embedded within any portion of the shoe, although in the preferred embodiments it is permanently embedded within a nonremovable part of the shoe. Also, the portion of the tab so sandwiched, enclosed or otherwise embedded need not be flat, but instead, e.g., can be folded or rolled.

Figure 4:
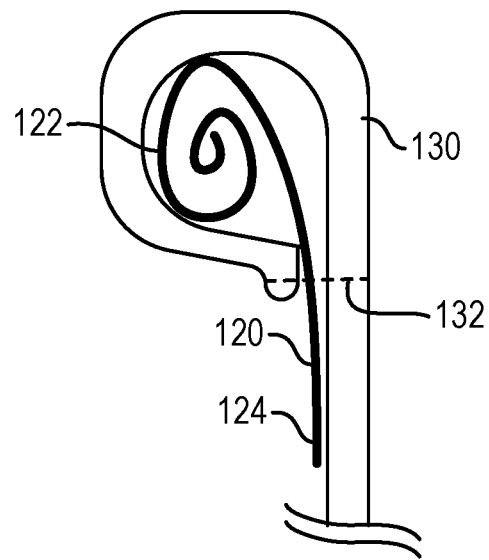
FIG. 4 is a cross-sectional view of a portion of a shoe having a securely printed tab according to a further embodiment.

For example, a cross-sectional view of a portion of a shoe according to a further embodiment is shown in FIG. 4, which illustrates a tab 120 having a hidden (imprinted) portion 122 that is rolled up and enclosed within the top portion of a shoe side wall 130. More specifically, in this embodiment the shoe upper is made of just a single wall 130 (i.e., non-layered), the very top of the edge of which being sewn into a loop using stitching 132. However, the hidden portion 122 of tab 120 is first rolled up before the side wall 130 is looped around it and stitched. As a result, the exposed portion 124 of tab 120 extends downwardly from the very top edge of side wall 130.

In the embodiments discussed above, the tab is attached to the bottom of the shoe or some portion of the shoe's upper. In other embodiments, the tab can be attached to any other component(s) or portion(s) of the shoe, such as the tongue (if provided) or a shoe strap (e.g., in the case of a sandal or a shoe having a high-density hook-and-loop, such as Velcro™, tightening strap). As indicated above, the hidden portion (which preferably includes printed or otherwise encoded information) can be sandwiched between layers forming such component(s) or portion(s) or can be enclosed within a single one of such component(s) or portion(s).

Figure 5:
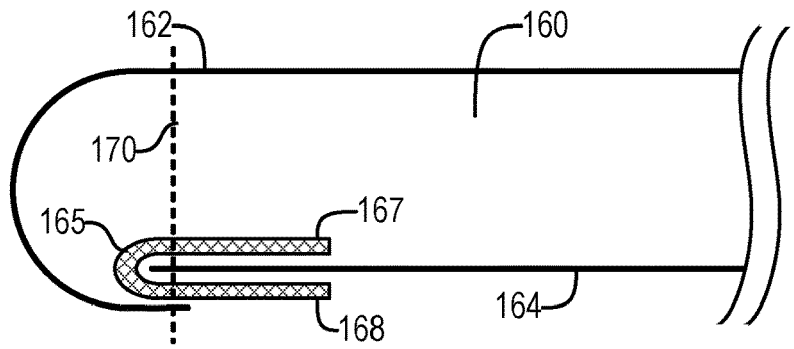
FIG. 5 is a longitudinal cross-section of a portion of a shoe's tongue that includes a securely printed tab.

Another example of a way in which a securely printed tab can be attached to a shoe according to the present invention is illustrated in FIG. 5. More specifically, FIG. 5 shows a portion of a shoe's tongue 160, including a top layer 162, a bottom layer 164 and securely printed tab 165. As shown, top layer 162 folds over the bottom of bottom layer 164, the printed hidden portion 167 of tab 165 is inserted between the top layer 162 and the bottom layer 164, tab 165 is looped back so that hidden portion 167 and exposed portion 168 are parallel and adjacent to each other, and then tongue 160 is sewn up by stitching 170 through top layer 162, tab 165, bottom layer 164, and then the folded-over portion of top layer 162. Preferably, the interior of tongue 160 (between the top layer 162 and the bottom layer 164) is filled with padding material.

Figure 6:
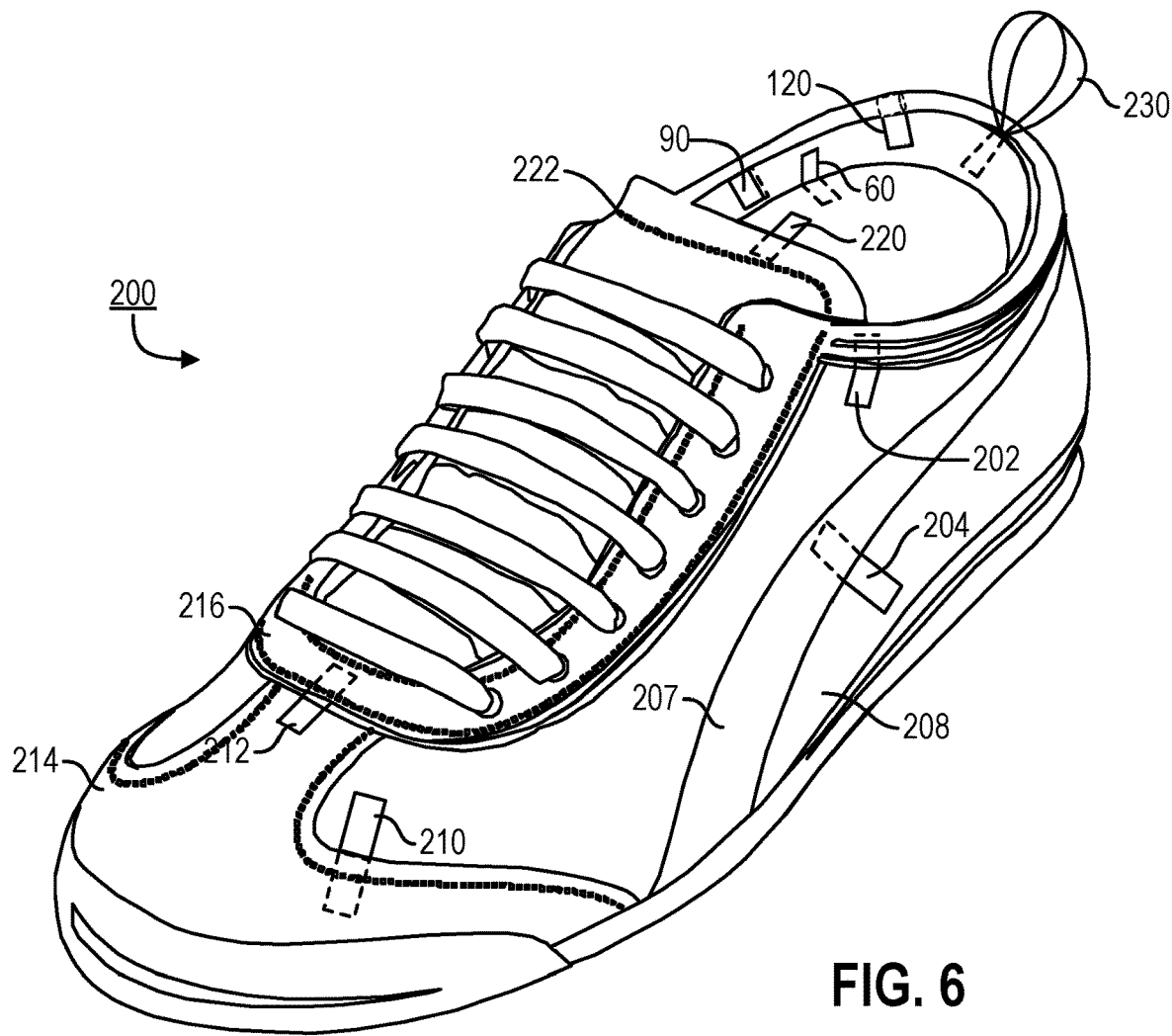
FIG. 6 is perspective view of a shoe illustrating different exemplary positions at which a securely printed tab can be located.

FIG. 6 illustrates different exemplary positions at which a securely printed tab according to the present invention can be located on a shoe 200. For instance, tab 60 (having a hidden imprinted portion that is disposed between layers of the shoe's sole and a visible portion that extends vertically up along the inside surface of the shoe's upper) has been described above in connection with FIG. 2. Tab 90 having a hidden imprinted portion that is sandwiched between the inner and outer walls of the shoe's upper and a visible portion that extends downwardly from the top edge of the shoe, parallel and adjacent to the hidden portion) has been described above in connection with FIG. 3. Tab 120 (having a hidden imprinted portion that is rolled up and enclosed within the top edge of the shoe's upper) has been described above in connection with FIG. 4. Tab 202 is similar to tab 120, but is attached further down from the top edge of the shoe's upper, so that the hidden portion can extend upwardly in parallel to the shoe's side wall.

Tab 204 is similar to tab 202, but instead of attaching close to the top edge of the shoe's upper, the visible portion of tab 204 protrudes from a location near the middle of the shoe's side wall, with the hidden portion being sandwiched between layers 207 and 208 of the shoe's side wall. Note that in the present example layer 207 only overlaps a relatively small portion (significantly less than half) of layer 208. Tab 210 is similar to tab 204, but the hidden printed portion of tab 210 is sandwiched between two layers that overlap near the front of the shoe 200, and the visible portion of tab 210 extends upwardly along the shoe's upper. Tab 212 also is similar to tab 204, but the hidden portion of tab 212 is disposed between the layer forming the front section of the shoe 200 and a layer 216 that is part of the lacing section of the shoe 200.

Tab 220 also is similar to tab 204, but the hidden portion of tab 220 is disposed between layers of the shoe's tongue. However, unlike tab 165, the visible portion of tab 220 does not run along the shoe's tongue 222, but rather extends straight out and away from it.

Tab 230 attaches to the top rear of the shoe's upper, with the hidden printed portion disposed between layers of the shoe's upper. In addition, the visible portion of tab 230 is formed into a loop in order to assist in pulling the shoe 200 onto the wearer's foot. It is noted that the visible portion of any of the other tabs discussed herein also can be formed into a loop, in which case the hidden printed portion of the tab typically will have two segments, corresponding to the two ends of the loop, and either or both of such segments can be imprinted with information, such as any of the identification information described above. For example, tab 220 can be formed into a loop so as to assist the user in pulling up tongue 222.

In addition to attaching a securely printed tab according to the present invention to other parts of the shoe, e.g., as indicated above, such a tab can be attached to laces, straps or other components of the shoe that are used for tightening the shoe around the wearer's foot. Preferably, however, such laces, straps or other components are non-removable parts of the shoe.

Figure 7:
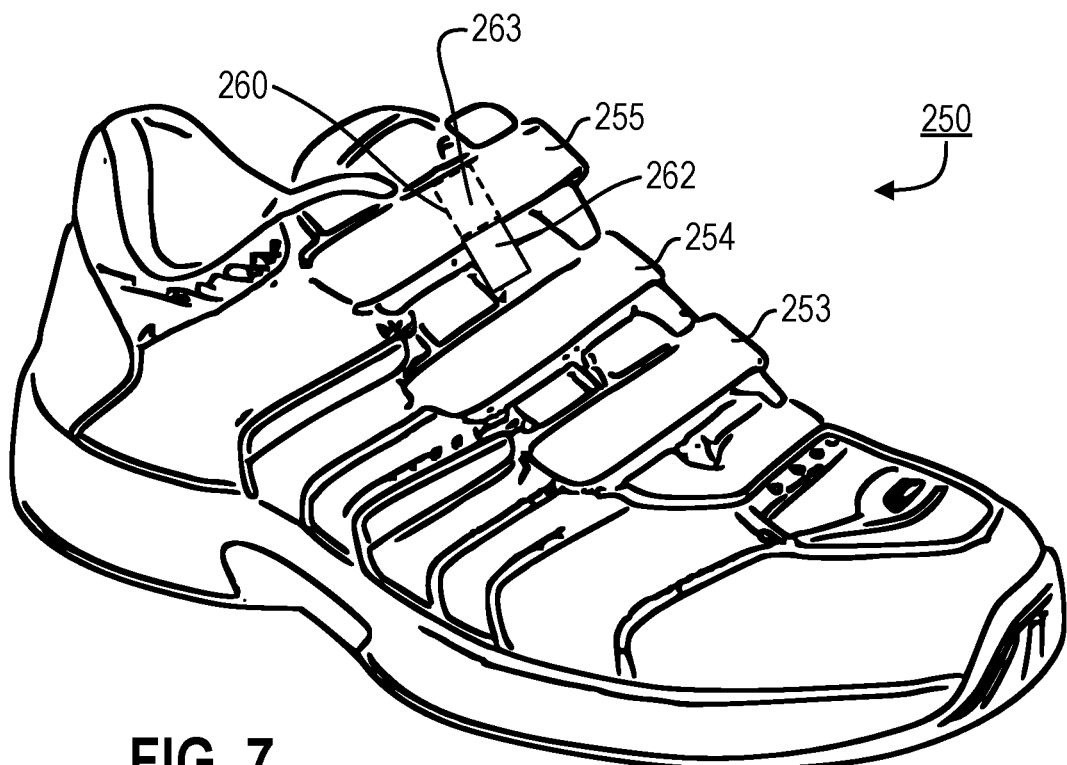
FIG. 7 is a perspective view of a shoe having a plurality of high-density hook-and-loop (e.g., Velcro™) straps, one of which having a securely printed tab.

An example is illustrated in FIG. 7, which shows a shoe 250 having a plurality of high-density hook-and-loop (e.g., Velcro™) straps 253-255 (e.g., having high-density hook or loop material along the entire underside of each of straps 253-255). Attached to strap 255 is a securely printed tab 260 that includes an exposed portion 262 and a hidden imprinted portion 263. In the present embodiment, the hidden imprinted portion 263 is disposed between the top layer (e.g., made a nylon) and the bottom layer (made of high-density hooks or loops) of strap 255, with the hidden imprinted portion 263 having been placed between such top and bottom layers, and then the top and bottom layers having been stitched together around the periphery of strap 255.

Figure 8:
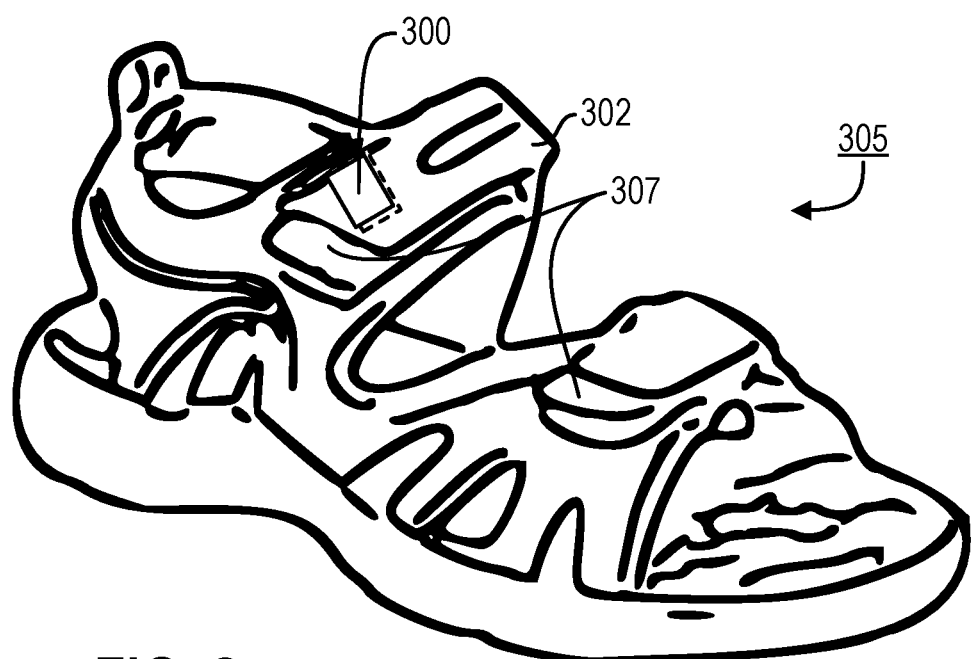
FIG. 8 is a perspective view of a sandal-style shoe having a plurality of straps, one of which having a securely printed tab.

In a similar embodiment, illustrated in FIG. 8, a securely printed tab 300 is attached to the strap 302 of a sandal 305. Strap 302 can employ any kind of tightening mechanism, but often will use mating high-density hook-and-loop materials (e.g., with a pad 307 of such material at the distal end of each strap. In the present embodiment, tab 300 attaches to strap 302 in a manner similar to the way that strap 90 attaches to the upper of shoe 80 (as discussed above in connection with FIG. 3).

Generally speaking, each of the embodiments described above concerns a shoe that includes a tab having two portions: a printed portion that is hidden from view by being permanently embedded within some preferably non-removable part of the shoe and a visible portion which also may include some printed information (the same or different than the information printed on the hidden portion). At the same time, in the preferred embodiments, the hidden portion of the tab is embedded within the shoe using a technique, such as stitching (which generally is preferred), or gluing where the adhesive material does not come into contact with the printed information, that permits retrieval of the hidden portion of the tab and reading of the information imprinted on it, when desired, albeit often with some disassembly or even partial destruction of the shoe.

The foregoing embodiments discuss attachment of a printed or otherwise encoded tab to various portions of a shoe. However, it should be noted that the same kind of printed or otherwise encoded tab can be attached to any other article of clothing or apparel, e.g., using any of the attachment techniques described above.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A product, comprising:
 a plurality of components; and
 a tab having a portion, that (i) is permanently embedded within a part of said product that includes at least one of the components, and thereby hidden from view, and (ii) comprises a memory device storing information pertaining to the product.

2. A product according to claim 1, wherein the tab also has a second portion that is visible during ordinary use of the product.

3. A product according to claim 2, wherein the second portion of the tab is configured as a piece of thin sheet material.

4. A product according to claim 3, wherein the second portion of the tab is rectangularly shaped and soft.

5. A product according to claim 2, wherein the second portion of the tab is imprinted with identification information pertaining to the product.

6. A product according to claim 2, wherein the second portion of the tab is formed into a loop.

7. A product according to claim 1, wherein the memory device is encoded with the information at least one of magnetically or in semiconductor form.

8. A product according to claim 1, wherein the portion of the tab is sandwiched between a first component and a second component of the product.

9. A product according to claim 8, wherein each of the first component and the second component is a layer of material.

10. A product according to claim 9, wherein the first component and the second component are attached to each other by at least one of gluing or stitching.

11. A product according to claim 9, wherein the portion of the tab is stitched between the first component and the second component.

12. A product according to claim 9, wherein the tab is attached to at least one of the first component and the second component with glue.

13. A product according to claim 1, wherein the product includes two adjacent layers attached to each other around their peripheries using stitching, and wherein the portion of the tab is disposed between said two adjacent layers.

14. A product according to claim 1, wherein the product is a children's product.

15. A product according to claim 1, wherein at least one of the components comprises a sheet material, and wherein the portion of the tab is enclosed within an edge of the sheet material that has been folded or looped over.

16. A product according to claim 1, wherein the product is an article of apparel.

17. A product according to claim 16, wherein the product is an article of footwear.

18. A product according to claim 1, wherein said part, into which said portion is permanently embedded, is a nonremovable part of said product.

19. A product according to claim 1, wherein the stored information pertaining to the product identifies a manufacturing lot of which the product was a part.

20. A product according to claim 1, wherein the stored information pertaining to the product identifies the product.

* * * * *